No. 892,595. PATENTED JULY 7, 1908.
G. KOCH.
VEHICLE SPRING.
APPLICATION FILED OCT. 15, 1907.
2 SHEETS—SHEET 1.
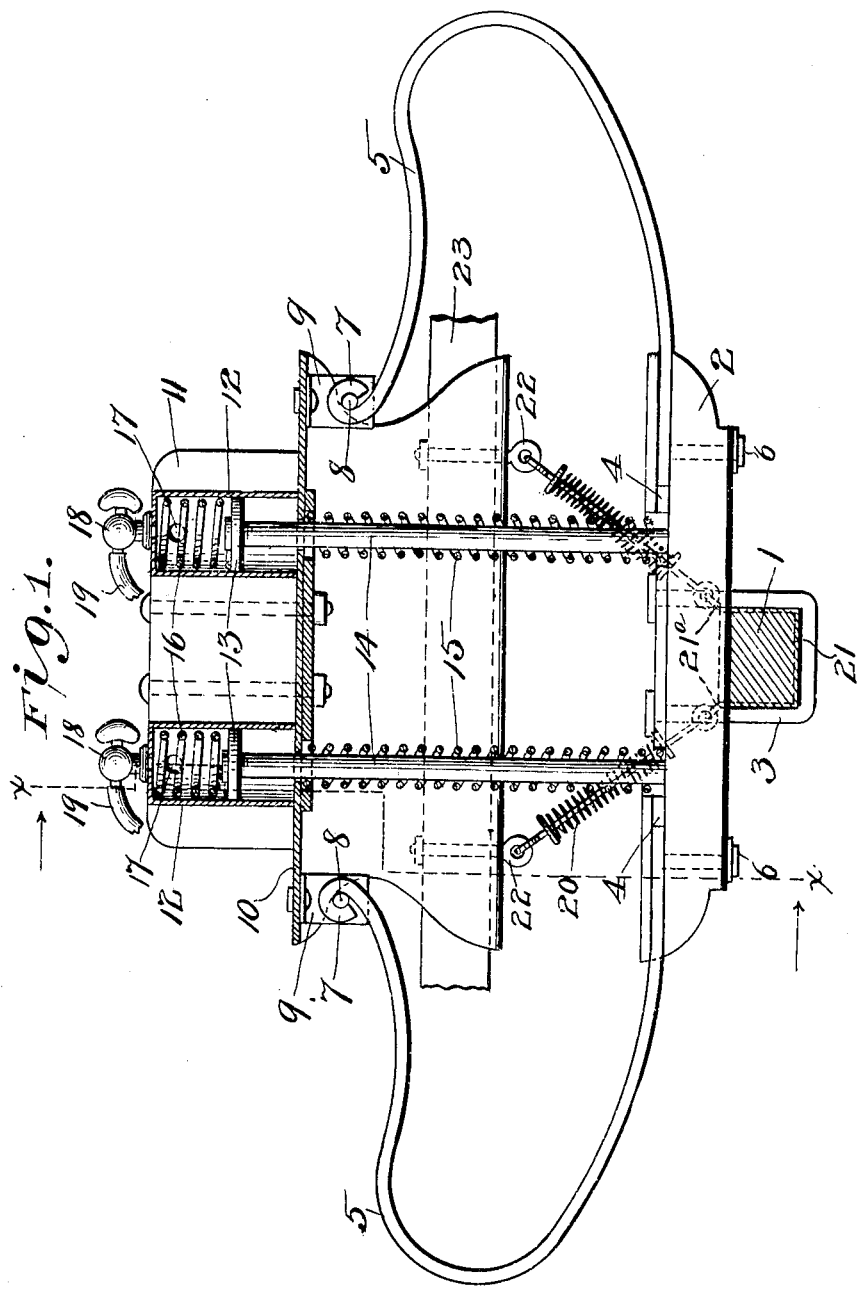
Witnesses
Inventor
Gustav Koch
By D. A. Gourick
Attorney

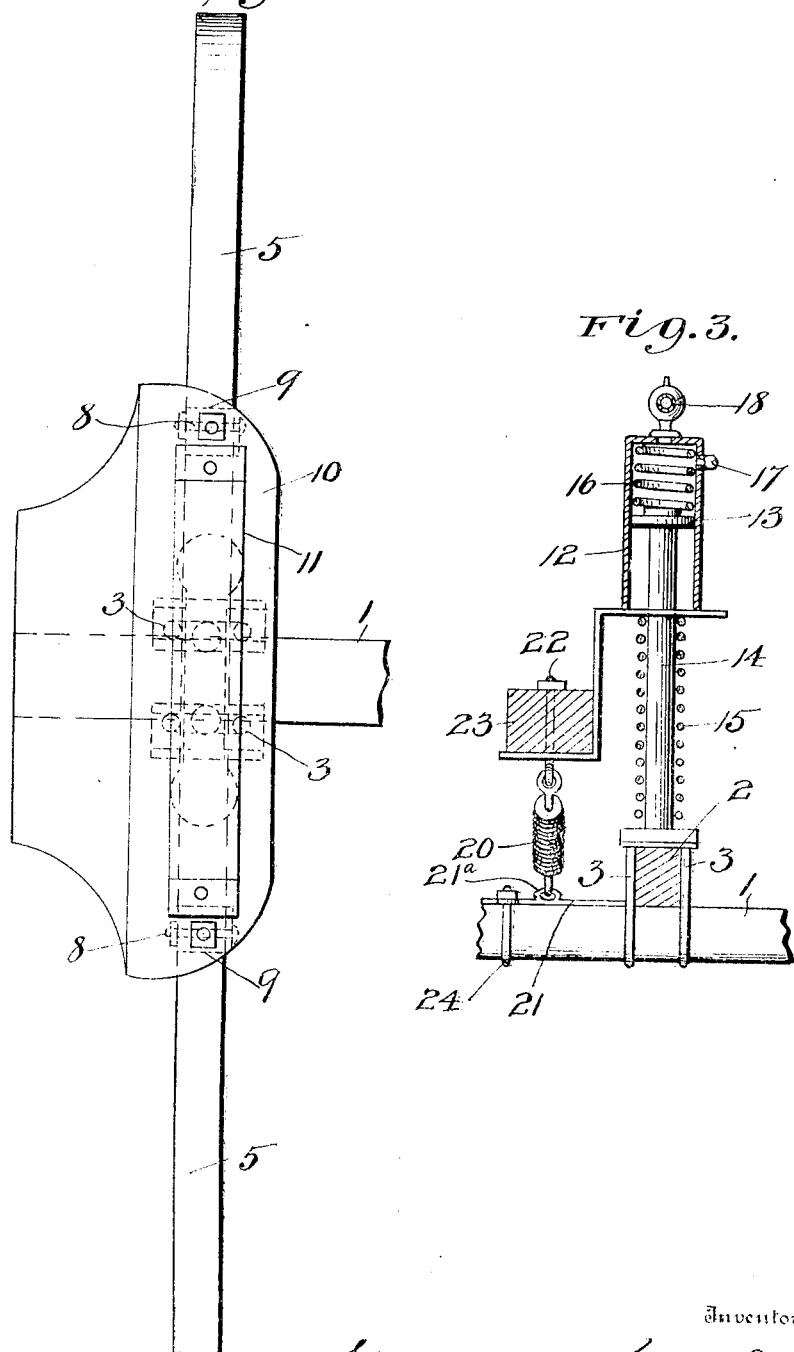

UNITED STATES PATENT OFFICE.

GUSTAV KOCH, OF ST. CLOUD, MINNESOTA.

VEHICLE-SPRING.

No. 892,595.  Specification of Letters Patent.  Patented July 7, 1908.

Application filed October 15, 1907. Serial No. 397,511.

*To all whom it may concern:*

Be it known that I, GUSTAV KOCH, a citizen of the United States, residing at St. Cloud, in the county of Stearns and State of Minnesota, have invented certain new and useful Improvements in Vehicle-Springs, of which the following is a specification.

My invention relates to springs for vehicles and especially to springs used on motor vehicles and has for its object the provision of means for taking up the jar incident to passing over unevennesses in the road, said means consisting of mounting plungers in air-tight casings so that the reciprocation of the plungers is utilized to pump air into a suitable reservoir from which it may be drawn to be used in inflating the tires of the vehicle as well as to operate the horn or for other purposes.

The construction, operation and advantages of my invention will be illustrated in the accompanying drawings in which—

Figure 1 is a side view partly in section of one of my improved springs, Fig. 2, a top plan view, and Fig. 3, a cross section on the line x—x of Fig. 1.

In the drawings similar reference characters indicate corresponding parts throughout the several views.

1 indicates the axle of a vehicle on which is secured the hanger 2 by means of U-shaped clips 3 or other preferred construction. Hanger 2 is provided with sockets 4 to receive one end of the bow springs 5, 6 indicating set screws to secure the ends of the springs in said sockets. The other ends of springs 5 are formed with eye-loops 7 to receive pins 8 secured in clips 9 on the under side of the body hanger 10. It will be understood from this construction that should one of the springs 5 be broken it can be quickly replaced without loss of time incidental to replacing broken springs as at present constructed.

11 indicates a cap piece secured to the top of body hanger 10 having air tight sockets 12 therein forming the cylinders of air pumps to receive the pistons 13 on the upper ends of rods 14 extending upwardly from axle hanger 2.

15 indicates a coil spring surrounding each of the rods 14 and bearing against axle hanger 2 and body hanger 10. 16 indicates a spring in each socket 12 interposed between the end of the piston and the end of the cylinder 12, the function of said springs 15 and 16 being to cushion the jar incident to passing over rough places in the road.

17 indicates valves leading to cylinders 12 and 18 valved pipe connections leading from said sockets and 19 pipes secured to said connections and leading to a suitable storage tank, not shown, the purpose of this construction being to utilize the reciprocation of the pistons 13 to store air to be used in inflating the tires of the vehicle, or sounding the horn alarm, etc.

20 indicates springs secured to ears 21$^a$ on plate 21 and to eyebolts 22 secured in the side sill 23 of the vehicle that rests on body hanger 10. The purpose of said springs 20 being to restrain the rebound of the body after passing over an obstruction. The plate 21 is secured to or formed integral with hanger 2 at one end and has its other end secured to axle 1 by means of clip 24.

Having thus described my invention what I claim is—

1. In a vehicle spring, in combination with the axle hanger, the body hanger, and bow springs connecting said hangers, a cap secured to the body hanger having sockets therein, rods secured to the axle hanger and having their ends inserted in said sockets, coil springs inclosing said rods and having their ends engaging said hangers, and coil springs in said sockets and engaging the ends of said rods, substantially as shown and described.

2. In a vehicle spring, in combination with the axle, the axle hanger, the body hanger, and bow springs connecting said hangers, a cap secured to the body hanger having sockets therein, rods secured to the axle hanger and having their ends inserted in said sockets, coil springs inclosing said rods and having their ends engaging said hangers, coil springs in said sockets and engaging the ends of said rods, the vehicle body sill secured to said body hanger, and springs secured to the axle and sill, substantially as shown and described.

3. In a vehicle spring, in combination with the axle, the axle hanger, the body hanger, and bow springs connecting said hangers, a cap secured to the body hanger having air tight sockets therein forming cylinders, rods secured to the axle hanger, pistons mounted in said cylinders and secured to said rods, inlet and exhaust valves connected with said cylinders, means to convey the air compressed in said cylinders to store it, the vehicle body sill secured to said body hanger, and springs secured to the axle and sill, substantially as shown and described.

4. In a vehicle spring, in combination with the axle, the axle hanger, the body hanger, and bow springs connecting said hangers, a cap secured to the body hanger having air-tight sockets therein forming cylinders, rods secured to the axle hanger, pistons mounted in said cylinders and secured to said rods, inlet and exhaust valves connected with said cylinders, means to convey the air compressed in said cylinders to store it, coil springs inclosing said piston rods and engaging said hangers, the vehicle body sill secured to said body hanger, and springs secured to the axle and sill, substantially as shown and described.

5. In a vehicle spring, in combination with the axle, the axle hanger, the body hanger, and bow springs connecting said hangers, a cap secured to the body hanger having air-tight sockets therein forming cylinders, rods secured to the axle hanger, pistons mounted in said cylinders and secured to said rods, inlet and exhaust valves connected with said cylinders, means to convey the air compressed in said cylinders to store it, coil springs inclosing said piston rods and engaging said hangers, other coil springs in the cylinders and bearing against the ends of the pistons, the vehicle body sill secured to said body hanger, and springs secured to the axle and sill, substantially as shown and described.

6. A vehicle spring comprising the combination with the axle, of an axle hanger having sockets therein, bow springs having one of their ends inserted in said sockets, set screws to secure said springs in said sockets, a body hanger, clips secured to said body hanger, the free ends of said springs formed with loops, pins secured through said loops and the clips on the body hanger, a cap secured to the body hanger having air tight sockets therein forming air pump cylinders, rods secured to the axle hanger, pistons mounted in said cylinders and secured to said rods, inlet and exhaust valves connected with said cylinders, means to convey the air compressed in said cylinders to store it, coil springs inclosing said piston rods and engaging said hangers, other coil springs in the cylinders and bearing against the ends of the pistons, the vehicle body sill secured to said body hanger, and springs secured to the axle and sill, substantially as shown and described.

In testimony whereof I hereto affix my signature in the presence of two witnesses.

GUSTAV KOCH.

Witnesses:
  J. I. DONOHUE,
  I. E. ROBINSON.